(12) United States Patent
Kubota

(10) Patent No.: US 6,200,078 B1
(45) Date of Patent: Mar. 13, 2001

(54) COMPLEX CUTTING-BLADE TOOL AND MACHINING METHOD USING SAME

(76) Inventor: Masao Kubota, 22-7, Narimasu 2-chome, Itabashi-ku, Tokyo, 175-0094 (JP)

( * ) Notice: Subject to any disclaimer, the term of this patent is extended or adjusted under 35 U.S.C. 154(b) by 0 days.

(21) Appl. No.: 09/263,821

(22) Filed: Mar. 8, 1999

(30) Foreign Application Priority Data

Mar. 9, 1998 (JP) .................................................. 10-98054

(51) Int. Cl.[7] .............................. B23B 51/08; B23C 5/12; B23G 5/06
(52) U.S. Cl. ............................ 409/74; 407/53; 408/22; 408/26; 408/211; 408/222; 408/224; 408/230; 408/713
(58) Field of Search .................................. 407/54, 53, 31; 408/22, 30, 24, 211, 222, 223, 224, 225, 230, 713, 74, 26; 409/66, 67, 74

(56) References Cited

U.S. PATENT DOCUMENTS

| | | | |
|---|---|---|---|
| 4,533,285 | * | 8/1985 | Jorgensen .............................. 408/191 |
| 4,564,321 | * | 1/1986 | Kondo et al. .......................... 407/34 |
| 5,035,551 | * | 7/1991 | Neumann .............................. 408/224 |
| 5,173,013 | * | 12/1992 | Gorse et al. ............................ 408/22 |
| 5,186,584 | * | 2/1993 | Mueller et al. ........................ 408/26 |
| 5,509,761 | * | 4/1996 | Grossman et al. ..................... 408/59 |

FOREIGN PATENT DOCUMENTS

| | | |
|---|---|---|
| 55-24804 | 2/1980 | (JP) . |
| 61-14810 | 1/1986 | (JP) . |
| 5-31814 | 4/1993 | (JP) . |
| 5-63713 | 8/1993 | (JP) . |

* cited by examiner

Primary Examiner—Daniel W. Howell
(74) Attorney, Agent, or Firm—Staas & Halsey LLP

(57) ABSTRACT

A complex cutting-blade tool wherein a neck having a smaller diameter than the diameter of the drill thereof is connected to a shank. At the place where the drill and the neck are connected is provided a burr removal cutting blade inclined roughly 45° from the tool center axis. A hole entrance beveling cutting blade is also mounted through fixture to the neck, inclined at an angle of roughly 45° from the tool turning center axis, in a direction opposite to the burr removal cutting blade. The fixture can be secured at any position along the length of the neck, wherefore the distance between the burr removal cutting blade and the hole entrance cutting blade can be suitably adjusted so as to correspond to the depth of the machined hole (i.e. the thickness of the workpiece).

10 Claims, 14 Drawing Sheets

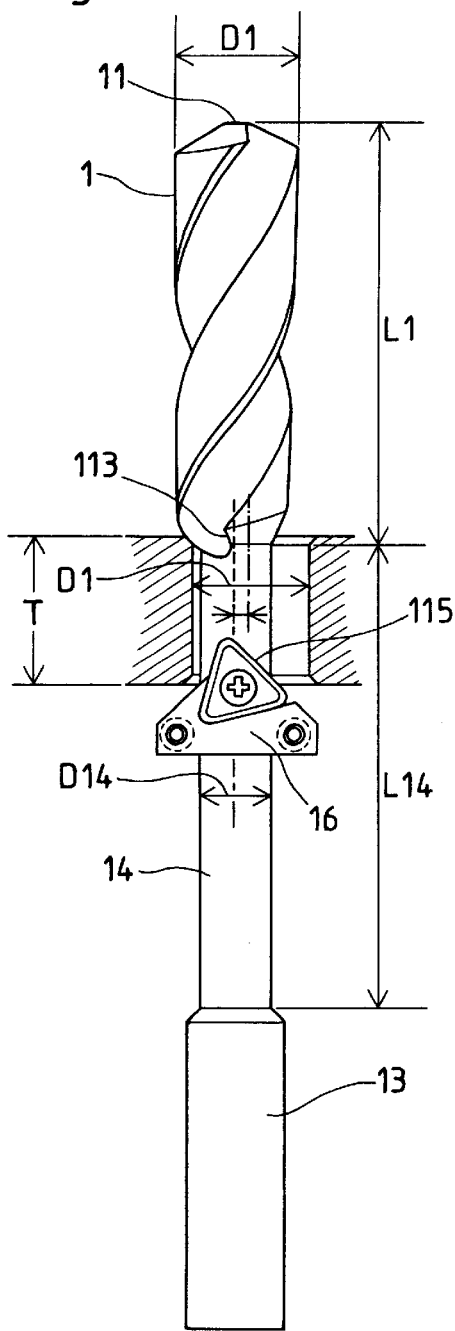
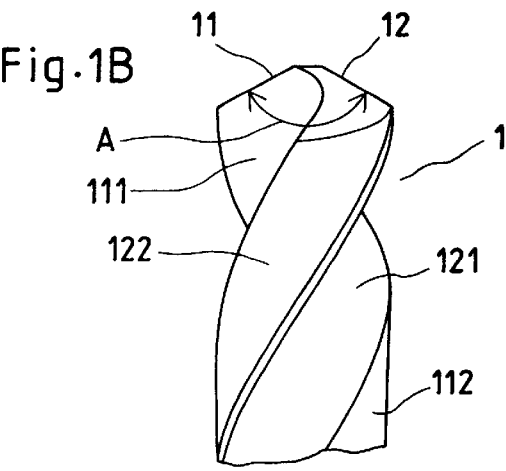
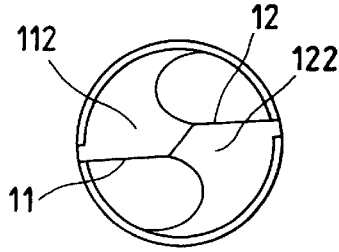
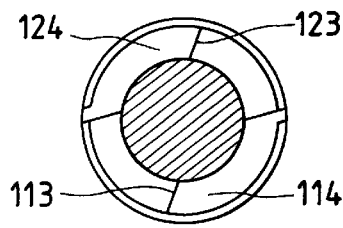
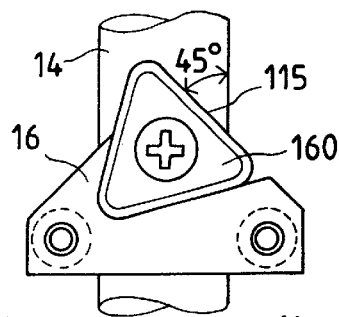
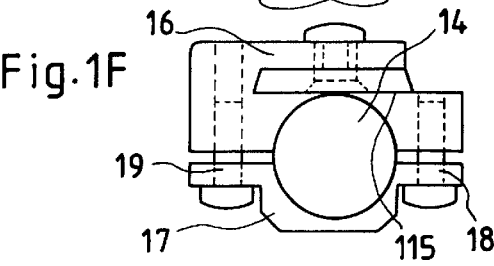

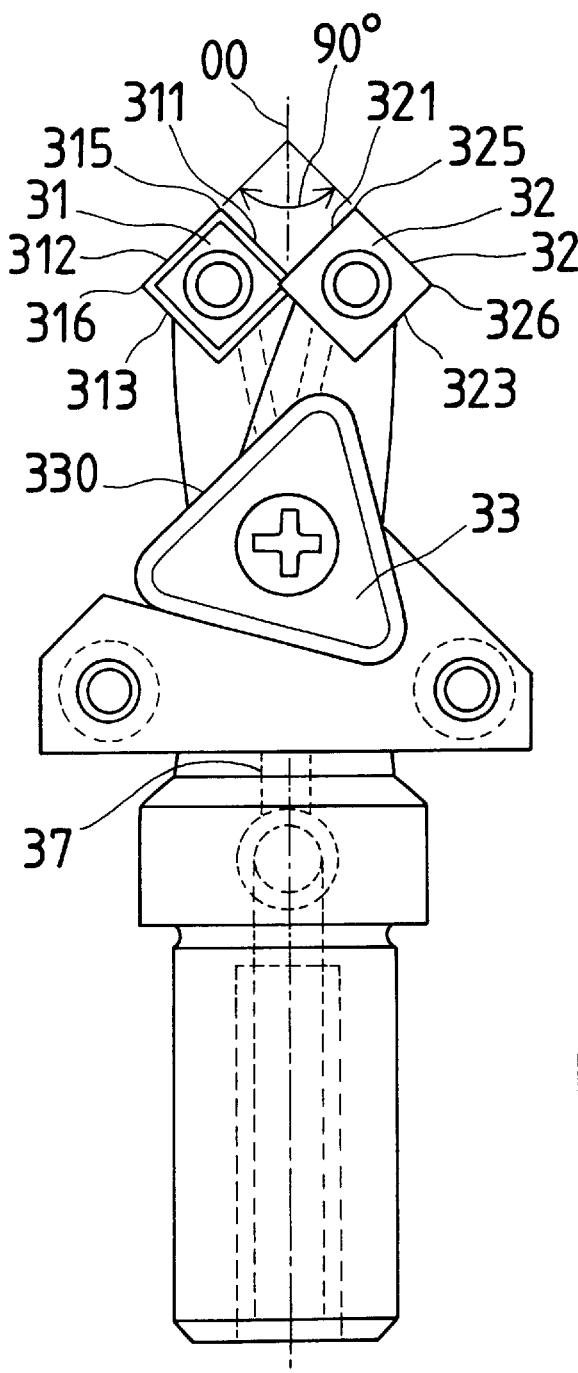
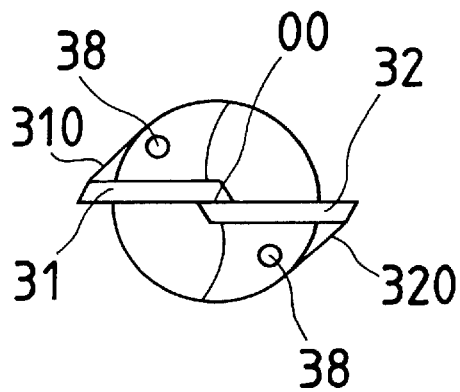
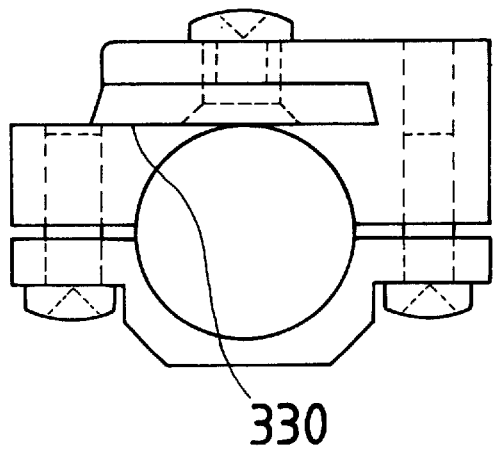

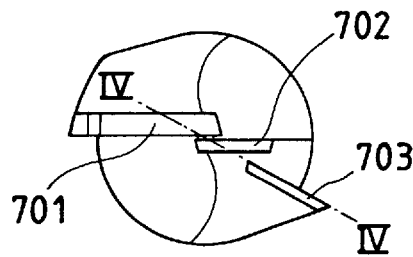
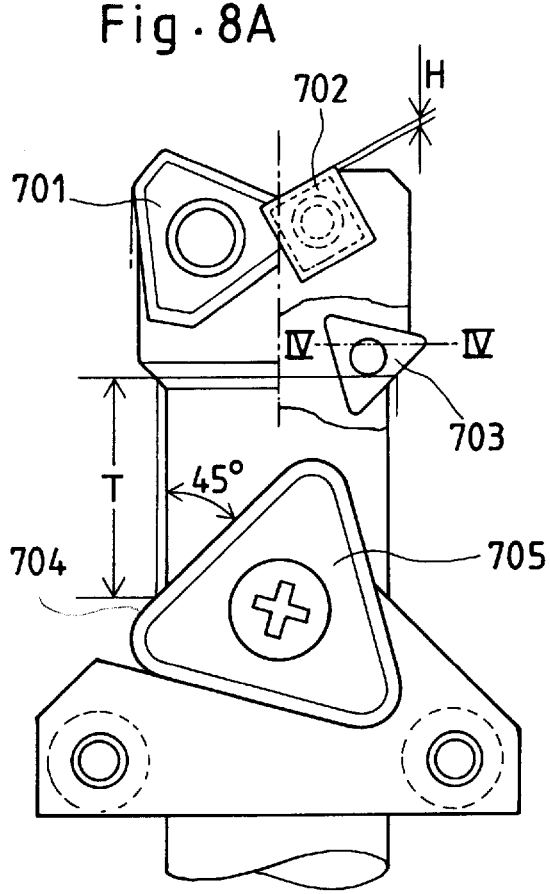
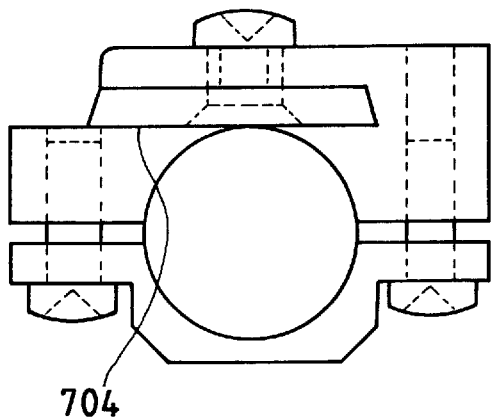

Fig. 10B    Fig. 10A
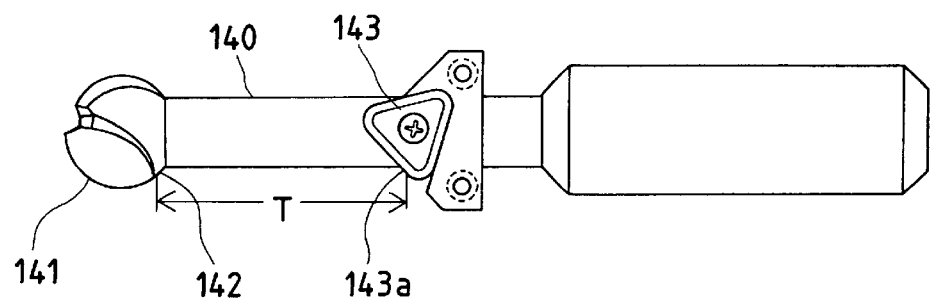
Fig. 11B    Fig. 11A
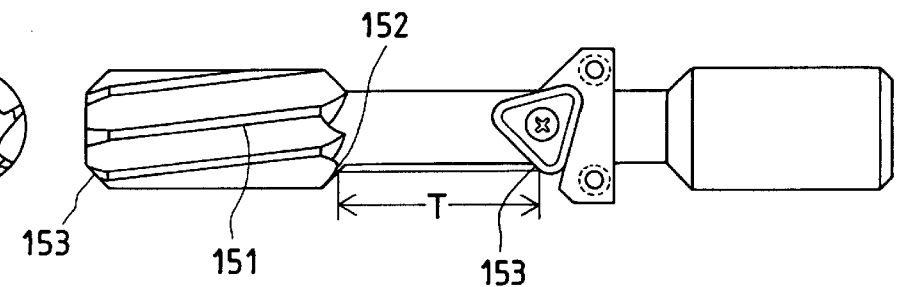

US 6,200,078 B1

COMPLEX CUTTING-BLADE TOOL AND MACHINING METHOD USING SAME

BACKGROUND OF THE INVENTION

1. Field of the Invention

This invention relates to a complex cutting-blade tool and to a machining method employing that complex cutting-blade tool, primarily for use in hole machining.

2. Description of the Related Art

When a through hole is formed in a piece of workpiece using a drill, burrs are produced at the exit of the through hole. It is also necessary in some cases to bevel both the entrance and exit of a through hole formed with the drill.

In Japanese Utility Model Application Laid-open No. 318149/1993 is disclosed art for using beveling and burr-removing cutting tools attached to a drill for removing the burrs from and beveling the exits of through holes opened with the drill and for beveling the entrances thereof. And in Japanese Utility Model Application Laid-open No. 63713/1993 is disclosed a cutting tool for beveling entrances and exits of through holes.

However, with the drills noted in the foregoing, the through hole exit burr removal and beveling process and the through hole entrance beveling process, done by causing the drill shank to revolve eccentrically about the machined hole, are separate processes. For that reason, the drill or tool is caused to revolve eccentrically about the machined hole to perform through hole exit burr removal and beveling, and then, subsequently, it is caused to revolve eccentrically about the machined hole to perform through hole entrance beveling. Thus, in order to perform beveling on the entrance side and beveling and burr removal on the exit side of one through hole, the same tool must perform the same movements twice, which requires a long time and is time-consuming.

Special tools for performing through hole entrance and exit beveling are disclosed in Japanese Patent Application Laid-open No. 24804/1980 and Japanese Patent Application Laid-open No. 14801/1986, but these tools can no longer be used once the height of the through hole (i.e. the thickness of the workpiece) has changed.

SUMMARY OF THE INVENTION

An object of the present invention is to facilitate the simultaneous implementation, in one process, of machined hole exit burr removal and beveling and machined hole entrance beveling, irrespective of the height of the machined hole (i.e. the thickness of the workpiece), by causing a complex cutting-blade tool to revolve eccentrically about the machined hole, thereby enhancing work efficiency.

In order to attain the object stated above, the complex cutting-blade tool according to the present invention comprises: a hole-opening cutting blade; a neck, in back of the hole-opening cutting blade, having an outer diameter smaller than the outer diameter of the hole-opening cutting blade; a hole exit burr removal and beveling cutting blade provided at the place of connection between the hole-opening cutting blade and the neck at an angle of inclination of 45° or an angle near thereto with respect to tool center axis; fixture, mounted on the neck, having securing means capable of being secured to the neck at any position in the length dimension thereof and to release that securing; and a hole entrance beveling cutting blade mounted on the fixture at an angle of inclination of 45° or an angle near thereto with respect to the tool center axis in a direction opposite to the inclination of the hole exit burr removal and beveling cutting blade.

When the complex cutting-blade tool according to the present invention is implemented, hole exit burr removal and beveling and hole entrance beveling can be performed continually and simultaneously, with one tool, without changing that tool. It is also possible to perform hole exit burr removal and beveling and hole entrance beveling using this complex cutting-blade tool automatically and with high efficiency by employing an NC, so that machining costs can be reduced. When necessary, moreover, an end mill function can be added, so that hole-related machining can be done at higher efficiency and lower cost. In particular, the present invention makes possible the automation of burr removal from parts having branching pipes added thereto, conventionally thought impossible. Another advantage is the capability of enhancing the general-purpose usefulness of hole entrance beveling tools.

BRIEF DESCRIPTION OF THE DRAWINGS

The foregoing and other objects and features of the present invention will become apparent from the following description of preferred embodiments of the present invention with respect to the accompanying drawings, in which:

FIG. 1A is an overall front elevation of a first embodiment of the complex cutting-blade tool according to the present invention;

FIG. 1B is a side elevation of the cutting tip portion of the tool diagrammed in FIG. 1A;

FIG. 1C is a plan of the cutting tip of the tool diagrammed in FIG. 1A;

FIG. 1D is a cross-sectional view of the burr removing cutting blade of the tool diagrammed in FIG. 1A;

FIG. 1E is a plan of the machined hole entrance beveling cutting blade of the tool diagrammed in FIG. 1A;

FIG. 1F is a cross-sectional view of fixture whereon is mounted the cutting blade diagrammed in FIG. 1E;

FIG. 3A is an overall front elevation of a first example of a third embodiment of the complex cutting-blade tool according to the present invention;

FIG. 3B is a top view of the tool diagrammed in FIG. 3A;

FIG. 3C is a cross-sectional view of fixture whereon is mounted the beveling cutting blade diagrammed in FIG. 3A;

FIG. 8A is an overall front elevation of a sixth example of the third embodiment;

FIG. 8B is a top view of the tool diagrammed in FIG. 8A;

FIG. 8C is a cross-sectional view of fixture whereon is mounted the beveling cutting blade diagrammed in FIG. 8A;

FIG. 10A is a side elevation of a first example of a fourth embodiment of the complex cutting-blade tool according to the present invention;

FIG. 10B is a front elevation of the tool diagrammed in FIG. 10A;

FIG. 11A is a side elevation of a second example of the fourth embodiment;

FIG. 11B is a front elevation of the tool diagrammed in FIG. 11A;

Figure 2A:
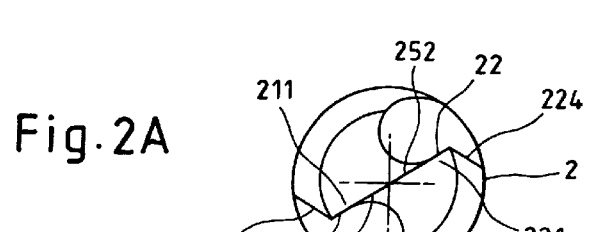
FIG. 2A is a top view of a second embodiment of the complex cutting-blade tool according to the present invention.
Figure 2B:
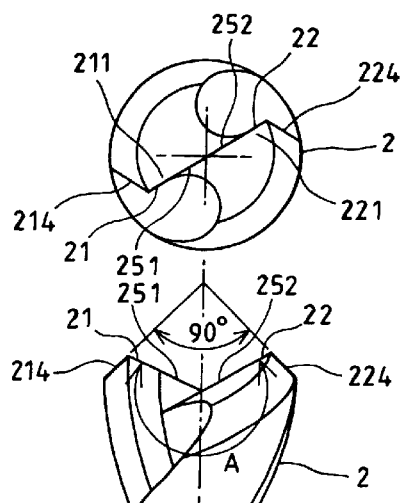
FIG. 2B is a side elevation of the cutting tip portion of the tool diagrammed in FIG. 2A.

DESCRIPTION OF THE PREFERRED EMBODIMENTS (1) A first embodiment of the complex cutting-blade tool according to the present invention is now described with reference to FIGS. 1A–1F.

This complex cutting-blade tool comprises a twist drill 1 having a tip angle A of less than 180° (A=118° in this embodiment) equipped with hole exit burr removal cutting blades 113 and 123 and a hole entrance beveling cutting blade 115 that are described below.

At the tip of the drill 1 are formed left and right hole-opening cutting blades 11 and 12, respectively, as diagrammed in FIG. 1B. To the left cutting blade 11 a cuttings channel 111 and a land 112 are connected. To the right cutting blade 12 a cuttings channel 121 and a land 122 are connected.

At the end of the lands 112 and 122 opposite the cutting blade, that is, at the front end (end nearer to the drill 1) of a neck 14 (described subsequently), burr removal cutting blades (which double as hole exit beveling blades) 113 and 123 are formed such that their tip angle becomes 90° as viewed from the drill end. These burr removal cutting blades 113 and 123 are provided with flanks 114 and 124.

The neck 14 is formed between the burr removal cutting blades 113 and 123 at one end and a shank 13 at the other. The diameter D14 of the neck 14 is smaller than the value obtained by subtracting twice the eccentricity E (described subsequently) from the diameter D1 of the drill 1, i.e. D1–2E. This complex cutting-blade tool, as will be described below, simultaneously performs burr removal and beveling to the exit of a through hole and beveling to the entrance of that through hole by eccentrically revolving, with an eccentricity E, about a machined hole opened by the drill 1.

The length L14 of the neck 14 is made a value that is sufficiently larger than the depth limit for the machined hole. On either side of this neck 14 are positioned a saddle 16, whereon is mounted a tip 160, and a saddle fastening clamp 17, in opposition to each other, as diagrammed in FIGS. 1E and 1F. When two clamp bolts 18 and 19 inserted through the saddle fastening clamp 17 toward the saddle 16 are tightened, respectively, the saddle 16 is secured in any desired position in the length dimension of the neck 14. Both the saddle 16 and the saddle fastening clamp 17 have curved parts of roughly the same curvature as, or have a curvature smaller than, the cross-section circular curvature of the neck 14, including zero or minus. The neck 14 is accepted into these curved parts so that, when the clamp bolts 18 and 19 are tightened, the saddle 16 is firmly secured to the neck 14. This saddle 16 may also be applied to a drill where the diameter of its neck is slightly different.

In the example diagrammed in FIG. 1A, a drill is driven upwards from below workpiece of thickness T to form a through hole in the workpiece. Thereupon, as diagrammed in FIG. 1A, burr removal on the exit side of the through hole is performed with the burr removal cutting blades 113 and 123 formed at the ends of the lands 112 and 122 in the drill 1, and, simultaneously, beveling on the entrance side of the through hole is performed with the cutting blade 115 of the tip 160 mounted on the saddle 16.

Even if the thickness of the workpiece (i.e. the height of the through hole) changes, by loosening and tightening the clamp bolts 18 and 19 the position on the neck 14 in which the saddle 16 is secured can be adjusted so that, while the burr removal cutting blades 113 and 123 are removing burrs from the exit of the through hole, the cutting blade 115 of the tip 160 mounted on the saddle 16 is beveling the entrance of the through hole.

The cutting blade 115 of the tip 160 mounted on the saddle 16 consists of a high speed steel or a super-hard tip and is inclined in the opposite direction from the burr removal cutting blades 113 and 123. As diagrammed in FIG. 1E, the cutting blade 115 of the tip 160 is inclined roughly at an angle of 45° from the outer circumference toward the tool end. The burr removal cutting blades 113 and 123, on the other hand, are inclined roughly at an angle of 45° from the outer circumference toward the shank 13.

When a positive rake angle is imparted to the burr removal cutting blades 113 and 123, the direction in which the complex cutting-blade tool turns in order to remove burrs with the burr removal cutting blades 113 and 123 becomes opposite to the direction in which the complex cutting-blade tool rotates in order to drill the through hole with the drill 1. For that reason, careful attention must be paid to the attitude in which the tip 160 is attached to the saddle 16.

(2) A second embodiment of the complex cutting-blade tool according to the present invention is now described with reference to FIGS. 2A–2D.

The complex cutting-blade tool comprises a twist having a tip angle A greater than 180°. The tip cutting blades 21 and 22 of the drill 2 are provided with flanks 211 and 221 so that a tip angle A of greater than 180° is formed. End mill functions are added to the ends of the tip cutting blades 21 and 22 which can be employed in counterboring around the hole.

Cutting blades 251 and 252 for cutting the center material have chisel edges, provide for adequate rake angles, and cut well with little thrust.

Figure 2C:
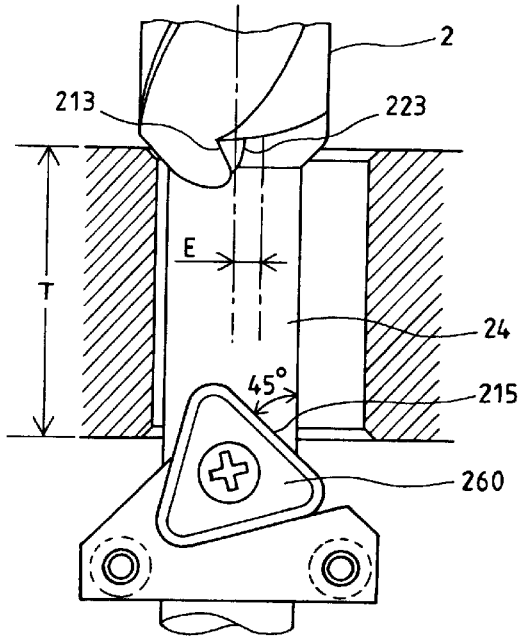
FIG. 2C is a diagram of the use of the tool diagrammed in FIG. 2A for simultaneously performing entrance beveling and exit burr removal on a machined hole.
Figure 2D:
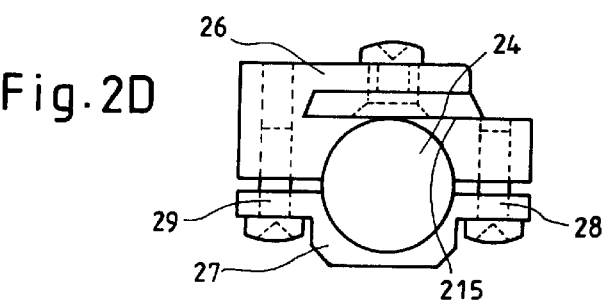
FIG. 2D is a cross-sectional view of fixture whereon is mounted the beveling cutting blade diagrammed in FIG. 2C.

At the shank end of the drill cutting blades, that is, at the front end of the neck 24, are formed burr removal cutting blades (which double as hole exit beveling cutting blades) 213 and 223, as diagrammed in FIG. 2C. To the neck 24 is secured a saddle 26 whereon is mounted a tip 260, using the same method wherewith the saddle 16 is secured to the neck 14, as was described with reference to FIGS. 1E and 1F. On the tip 260 is formed a hole entrance beveling cutting blade 215.

Accordingly, by loosening and tightening two clamp bolts 28 and 29, respectively, that are inserted from a saddle fastening clamp 27 toward the saddle 26, the saddle 16 (i.e. the beveling cutting blade 215 of the tip 260) can be secured in a position corresponding to the thickness T of the workpiece.

(3) A third embodiment of the complex cutting-blade tool according to the present invention is now described with reference to FIGS. 3A–9C.

This complex cutting-blade tool is provided at its tip with a tip-clamp type drill. The tip edges, as a rule, are placed so that they are parallel to the radial plane. Around the entire circumference of the tip is formed a chip breaker having a positive rake angle, providing a suitable clearance angle. The tip is positioned so that the direction of drill rotation is constant. A number of examples are now described which are subsumed under this embodiment.

(3.1) A first example is described with reference to FIGS. 3A–3C. The complex cutting-blade tool comprises two square tips 31 and 32 at its tip which are rounded at their corners. In these tips 31 and 32 are set tip supports 310 and 320 (FIG. 3B) such that one diagonal of each square is parallel to the tool center axis 00.

To the neck, moreover, is attached an equilateral triangular tip 33 having the same structure as in the first embodiment (cf. FIG. 1E) by fixture (saddle, saddle fastening clamp, and clamp bolts) having the same structure as in the first embodiment.

The tips 31 and 32 comprise cutting blades 311 and 321 for cutting the hole center, cutting blades 312 and 322 for cutting around the periphery of the hole, and cutting blades 313 and 323 for performing hole exit burr removal. These tips 31 and 32 also have rounded blades 315 and 325 which function both as drill tip cutting blades and end-mill bottom blades, and rounded blades 316 and 326 which function as hole finishing cutting blades. The two tips 31 and 32 having the cutting blades described above exhibit good left-right balance in cutting resistance.

The cutting blade 330 of the equilateral triangular tip 33 is used for hole entrance burr removal. This cutting blade 330 is inclined about 45° from the drill centerline 00 in a direction opposite from the direction of inclination of the burr removal dub 313. This tip 33 is attached by fixture which includes a saddle, etc.

Reference numeral 37 in FIG. 3A denotes a passageway for the passage of cutting fluid through the tool toward the top thereof. This passageway divides into two branches near the top of the tool. Cutting fluid passing through this passageway 37 is discharged to the exterior from two cutting holes 38 that are formed in the tool body.

Figure 4A:
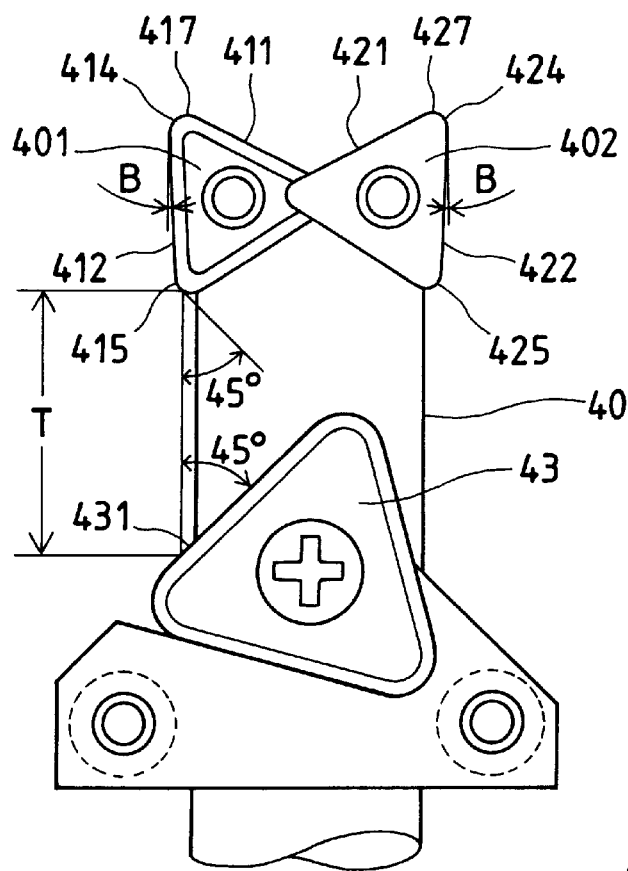
FIG. 4A is an overall front elevation of a second example of the third embodiment.
Figure 4B:
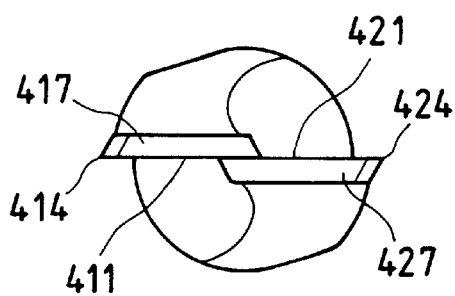
FIG. 4B is a top view of the tool diagrammed in FIG. 4A.
Figure 4C:
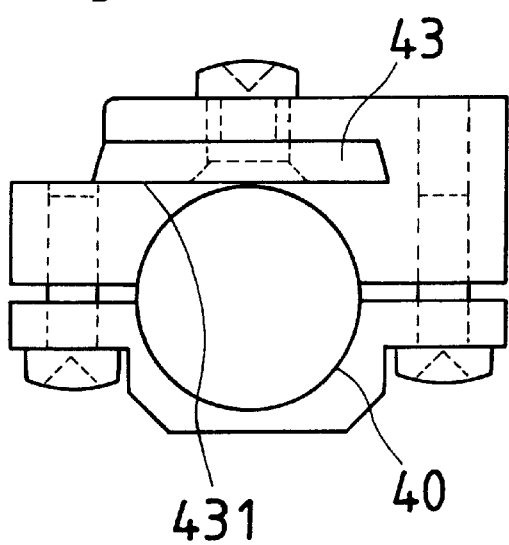
FIG. 4C is a cross-sectional view of fixture whereon is mounted the beveling cutting blade diagrammed in FIG. 4A.

(3.2) A second example is described with reference to FIGS. 4A–4C. The complex cutting-blade tool comprises, at its top, a pair of equilateral triangular tips 401 and 402 which are rounded at their corners. To the neck, moreover, is attached an equilateral triangular tip 43 by fixture having the same structure as in the first embodiment.

The tips 401 and 402 have linear cutting blades 411 and 421 for cutting hole centers, linear cutting blades 412 and 422 for rough-cutting holes, and rounded circular-arc shaped cutting blades 414 and 424 for finishing the inner walls of the holes. The linear cutting blades 412 and 422 are provided with a slight back taper B and set in tip supports, as diagrammed in FIG. 4A. The rounded circular-arc shaped cutting blades 415 and 425 serve as hole exit burr removal cutting blades.

Near the rounded circular-arc shaped cutting blades 414 and 424 of the tips 401 and 402 are formed cutting blades 417 and 427 which serve as end-mill bottom blades.

A cutting blade 431 in the equilateral triangular tip 43 having the same structure as the tip 160 in the first embodiment is used for hole entrance burr removal. As diagrammed in FIG. 4A, this tip 43 is mounted on a saddle (cf. FIG. 4C) so that the cutting blade 431 is inclined about 45° from the tool center axis. This saddle is attached to the neck 40 in the same manner as in the first embodiment (cf. FIG. 1F). Specifically, by loosening and tightening two clamp bolts, respectively, that are passed from a saddle fastening clamp toward the saddle, the saddle (which is to say the burr removal cutting blade 431 of the tip 343) may be secured in any position along the length of the neck 40. Thus the position of the tip 43 is adjusted so that the distance between the hole entrance beveling cutting blade 431 and the cutting blades 415 and 425 for removing the burrs produced at the hole exit becomes a value that corresponds with the machined hole depth T (cf. FIG. 8A).

Figure 5A:
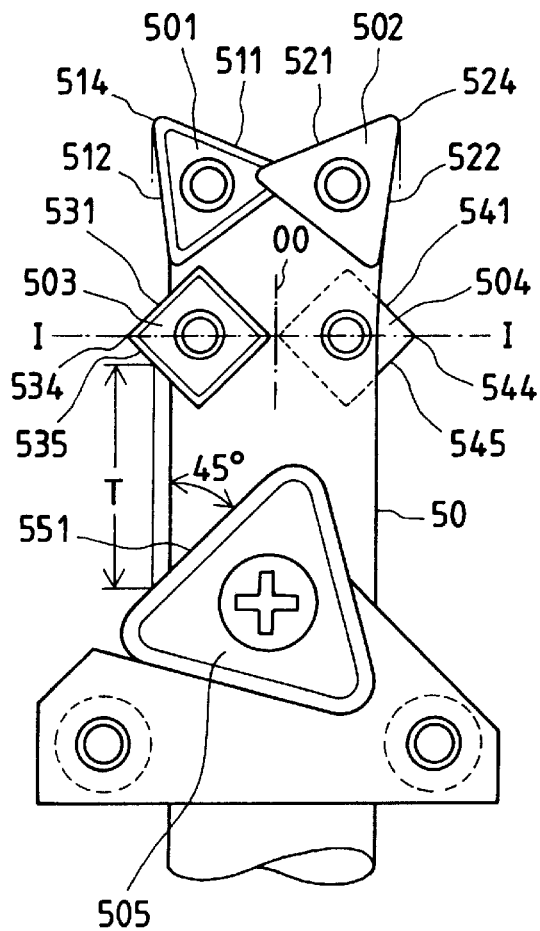
FIG. 5A is an overall front elevation of a third example of the third embodiment.
Figure 5B:
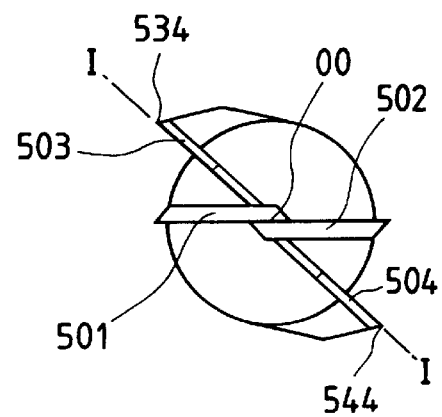
FIG. 5B is a top view of the tool diagrammed in FIG. 5A.
Figure 5C:
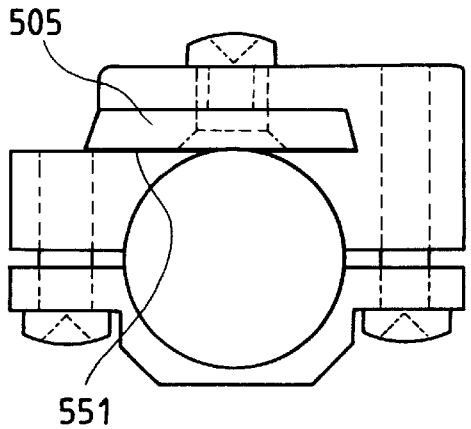
FIG. 5C is a cross-sectional view of fixture whereon is mounted the beveling cutting blade diagrammed in FIG. 5A.

(3.3) A third example is described with reference to FIGS. 5A–5C. The complex cutting-blade tool has at one end thereof two equilateral triangular tips 501 and 502 with rounded corners, and two more equilateral triangular tips 503 and 504 behind the tips 501 and 502. To the neck 50 is attached an equilateral triangular tip 505 having the same structure as in the first embodiment.

The equilateral triangular tips 501 and 502 have top interior cutting blades 511 and 521 for cutting hole centers, exterior cutting blades 512 and 522 for performing rough hole cutting, and corner rounded blades 514 and 524 for finishing the inner walls of the holes. The exterior cutting blades 512 and 522 also function as end mill side blades, and are provided with a very slight back taper. The corner rounded blades 514 and 524 also function as end mills for cutting corner material.

Figure 9A:
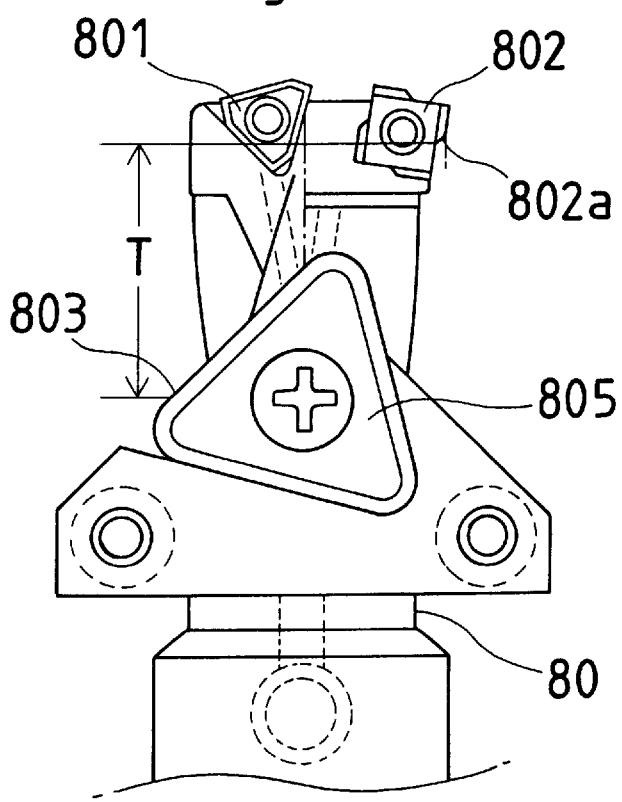
FIG. 9A is an overall front elevation of a seventh example of the third embodiment.

One diagonal of each of the equilateral triangular tips 503 and 504 forms a right angle with the tool center axis 00, as diagrammed in FIG. 9A. These tips 503 and 504 are inset away from the wall surface for protection, as diagrammed in FIG. 5B. The cutting blades 531 and 541 of the tips 503 and 504 are inclined about 45° from the tool center axis 00 and are used together with the rounded blades 534 and 544 for hole finishing. The cutting blades 535 and 545 of the tips 503 and 504, on the other hand, are inclined about 45° in a direction opposite from the cutting blades 531 and 541 and are used as cutting blades for removing burrs from hole exits.

The cutting blade 551 of this tip 505 serves as a hole entrance beveling cutting blade for beveling hole exits. The angle of this hole entrance beveling cutting blade 551 is inclined about 45° from the tool centerline on the side opposite from the burr removal cutting blades of the tips 503 and 504. This tip 505 is mounted on a saddle (cf. FIG. 5C). This saddle is attached to the neck 50 in the same manner as in the first embodiment (cf. FIG. 1F). Accordingly, the position of the tip 505 is adjusted so that the distance between the hole entrance beveling cutting blade 551 and the cutting blade 535 for removing burrs produced at the hole exit becomes a value that corresponds with the depth T of the machined hole (cf. FIG. 5A).

Figure 6A:
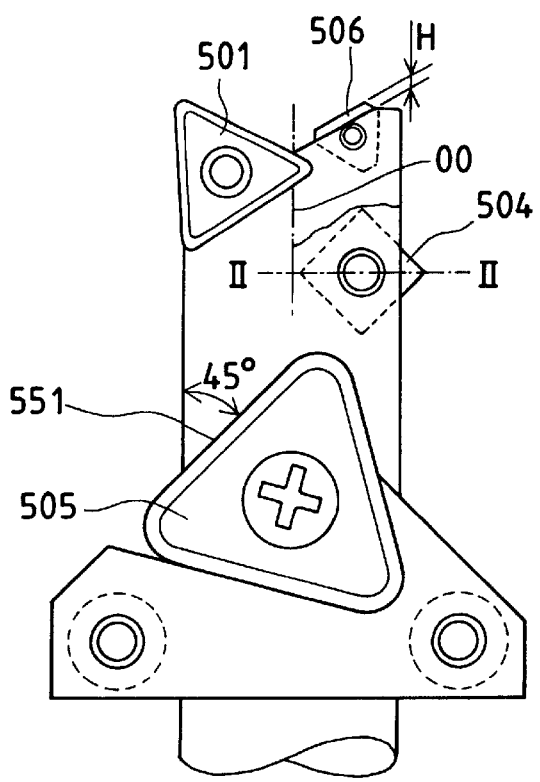
FIG. 6A is an overall front elevation of a fourth example of the third embodiment.
Figure 6B:
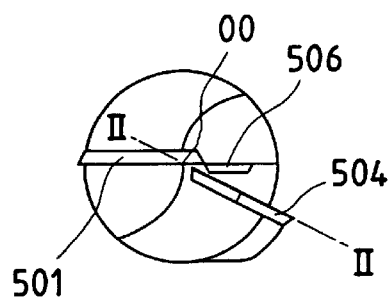
FIG. 6B is a top view of the tool diagrammed in FIG. 6A.
Figure 6C:
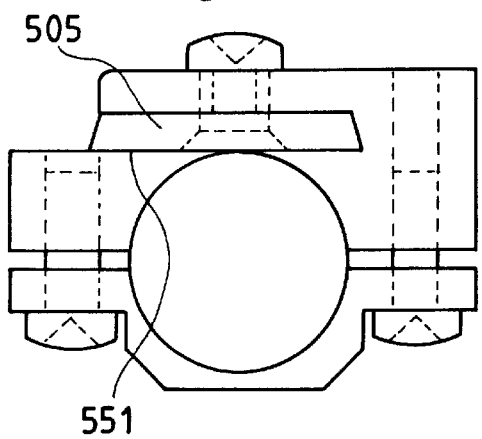
FIG. 6C is a cross-sectional view of fixture whereon is mounted the beveling cutting blade diagrammed in FIG. 6A.

(3.4) A fourth example is described with reference to FIGS. 6A–6C. The complex cutting-blade tool comprises, at one end thereof, one equilateral triangular tip 501 and one small equilateral triangular tip 506, and also comprises one equilateral triangular tip 504 behind these tips 501 and 506. Another equilateral triangular tip 505 having the same structure as in the first embodiment is attached to the neck by fixture having the same structure as in the first embodiment.

The structure of the tip 501 is the same as that of the tip 501 in the third example diagrammed in FIG. 9A. The small equilateral triangular tip 506 is given a lip height H that is greater than the half-turn feed amount. "Lip height" refers to the difference in the height in the tool center axis dimension between the left cutting blade and right cutting blade of the drill. If the lip height is not zero, a difference in the thickness of the tips produced by the left and right cutting blades develops, wherefore, it is usually desirable that the lip height be zero. Nevertheless, if a lip height of more than half of the maximum feed amount per drill rotation is positively added, it is possible to improve cutting resistance balance using the fact that the left and right cutting blades are insensitive to angle errors.

The cutting blade 551 of the equilateral triangular tip 505 is used for beveling hole entrances.

(3.5) A fifth example is described with reference to FIGS. 7A–7C. The complex cutting-blade tool comprises, at the top thereof, a pair of modified equilateral triangular tips 601 and 602, and also a pair of equilateral triangular tips 631 and 632 behind the tips 601 and 602. To the neck is attached an equilateral triangular tip 605 having the same structure as in the first embodiment by fixture having the same structure as in the first embodiment.

The tips 601 and 602 are shaped such that the apex portions of the equilateral triangular tips have been removed on a 45° diagonal. The cutting blades 611 and 612 thereof cut out hole centers.

On the tips 631 and 632 are formed burr removal cutting blades inclined about 45° from the tool centerline.

The cutting blade 633 of the equilateral triangular tip 605 is used for hole entrance beveling. The angle of the cutting blade 633 is inclined about 45° relative to the tool centerline, on the side opposite the burr removal cutting blades of the tips 631 and 632. The position of the tip 633 is adjusted so that the distance between the hole entrance beveling cutting blade 633 and the cutting blades 631 and 632 for removing burrs that develop at hole exits becomes a value corresponding with the depth T of the machined hole (cf. FIG. 7A).

(3.6) A sixth example is described with reference to FIGS. 8A–8C. The complex cutting-blade tool comprises, at the top thereof, one modified equilateral triangular tip 701, a small square tip 702 having a lip height H, and one equilateral triangular tip 703 behind the tips 701 and 702. To the neck is attached an equilateral triangular tip 705 having the same structure as in the first embodiment by fixture having the same structure as in the first embodiment.

Figure 7A:
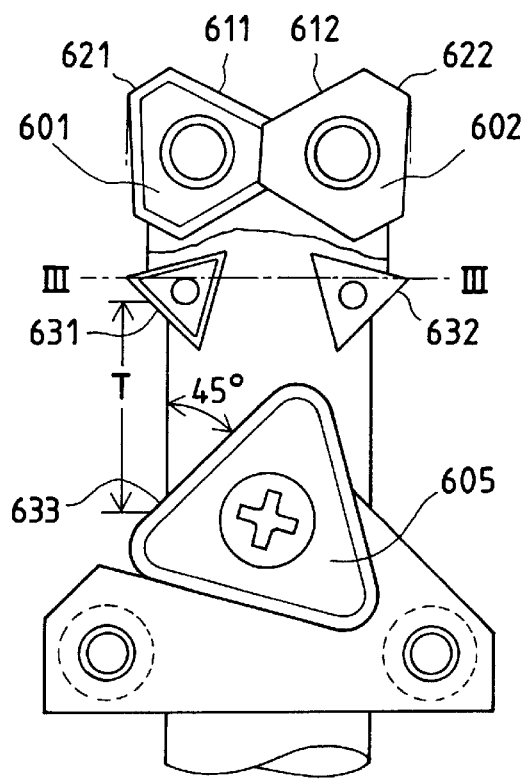
FIG. 7A is an overall front elevation of a fifth example of the third embodiment.
Figure 7B:
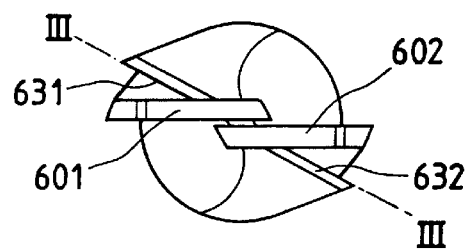
FIG. 7B is a top view of the tool diagrammed in FIG. 7A.
Figure 7C:
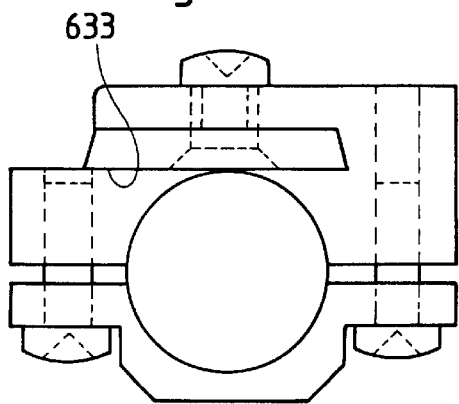
FIG. 7C is a cross-sectional view of fixture whereon is mounted the beveling cutting blade diagrammed in FIG. 7A.

The structure of the modified equilateral triangular tip 701 is the same as that of the modified equilateral triangular tip 601 in the fifth example (FIG. 7A). By positively imparting a lip height H to the small square tip 702, that tip 702 counterbalances the cutting resistances developed during machining by the modified equilateral triangular tip 701.

The equilateral triangular tip 703 is used for hole diameter finishing and burr removal.

The cutting blade 704 of the equilateral triangular tip 705 is used for hole entrance beveling. The angle of this cutting blade 704 is inclined about 45° from the tool centerline. The position of the tip 705 is adjusted so that the distance between the hole entrance beveling cutting blade 704 and the cutting blade 703 for removing burrs that develop at hole exits becomes a value corresponding with the depth T of the machined hole (cf. FIG. 8A).

Figure 9B:
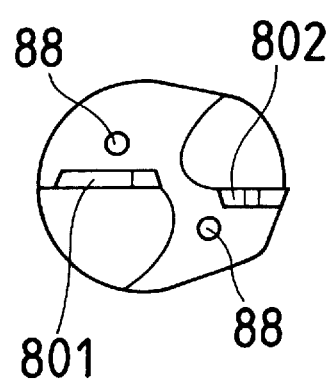
FIG. 9B is a top view of the tool diagrammed in FIG. 9A.
Figure 9C:
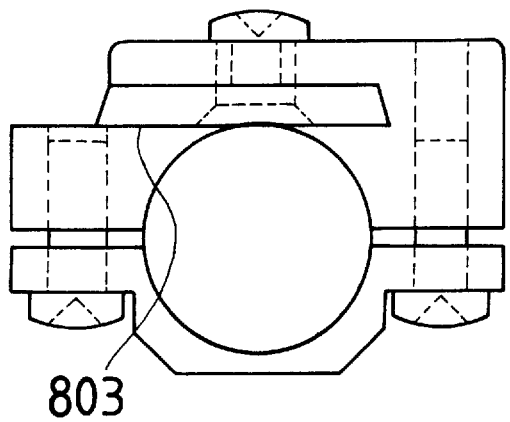
FIG. 9C is a cross-sectional view of fixture whereon is mounted the beveling cutting blade diagrammed in FIG. 9A.

(3.7) A seventh example is described with reference to FIGS. 9A–9C. The complex cutting-blade tool has a modified equilateral triangular tip 801 in the center part (i.e. the part near the tool center axis) of the top thereof and a modified square tip 802 at the periphery of the top thereof. To the neck 80 is attached an equilateral triangular tip 805 having the same structure as in the first embodiment by fixture having the same structure as in the first embodiment.

The cutting blade 802a of the modified square tip 802 is used for removing burrs that develop at hole exits.

The cutting blade 803 of the equilateral triangular tip 805 is used for hole entrance beveling. The position of the tip 805 is adjusted so that the distance between the hole entrance beveling cutting blade 803 and the cutting blade 802a for removing burrs that develop at hole exits becomes a value corresponding with the depth T of the machined hole (cf. FIG. 9A).

(4) A fourth embodiment of the complex cutting-blade tool according to the present invention is now described with reference to FIGS. 10A–12C.

This complex cutting-blade tool is used with a tool such as an end mill or reamer which is not a drill and which already comprises a burr removal cutting blade at the shank end of the tool cutting blade. To the neck of this cutting tool is attached a saddle (fixture) capable of securing at any position along the length thereof. On that saddle is mounted a tip having a hole entrance beveling cutting blade formed therein. It is preferable that the shank to which this saddle is attached have a small diameter. Examples subsumed under this embodiment are now described.

(4.1) A first example is described with reference to FIGS. 10A and 10B. In a ball end mill having a roughly spherical head and a shaft having a diameter smaller than the diameter of that head, a spherical cutting blade 141 is extended toward the back, and a burr removal cutting blade 142 to which a suitable clearance angle of about 45° with the tool center axis is imparted is connected to that cutting blade 141. This burr removal cutting blade 142 is also used for beveling the hole exit.

To the neck 140 of this ball end mill is attached a saddle that can be secured in any position along the length thereof, and on that saddle is mounted a tip 143 in which is formed a hole entrance beveling cutting blade 143a. Accordingly, the position of the tip 143 is adjusted so that the distance between the hole entrance beveling cutting blade 143a and the cutting blade 142 for removing burrs that develop at hole exits becomes a value corresponding with the depth T of the machined hole (cf. FIG. 10A).

When an eccentric revolving movement is imparted to the ball end mill diagrammed in FIG. 10A inside a through hole, hole exit burr removal and hole entrance beveling can be performed simultaneously.

(4.2) A second example is described with reference to FIGS. 11A and 11B. At the neck end of a reamer cutting blade 151 is provided a burr removal cutting blade 152 inclined roughly 45° from the tool center axis and given a suitable clearance angle.

To the neck 150 of this reamer is attached a saddle that can be secured in any position along the length thereof, and on that saddle is mounted a tip 153 in which is formed a hole entrance beveling cutting blade 153a. Accordingly, the position of the tip 153 is adjusted so that the distance between the hole entrance beveling cutting blade 153a and the cutting blade 152 for removing burrs that develop at hole exits becomes a value corresponding with the depth T of the machined hole (cf. FIG. 11A).

Figures 12A, 12B, 12C:
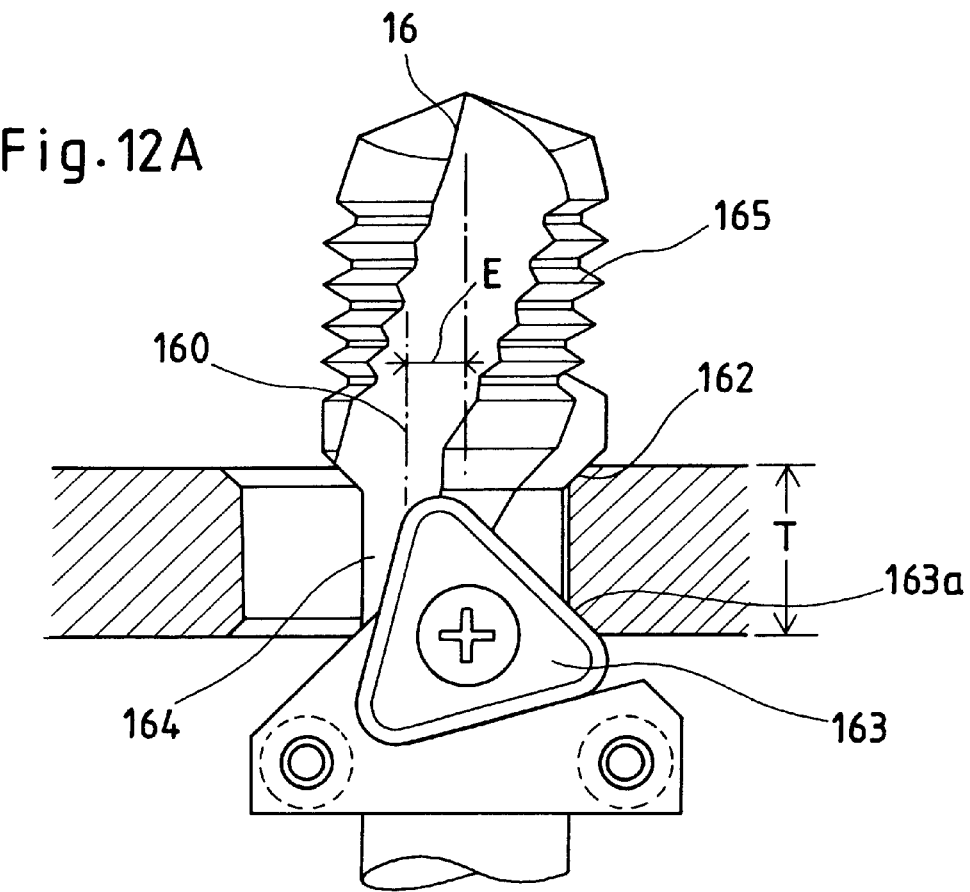
FIG. 12A is a side elevation of a third example of the fourth embodiment.
FIG. 12B is a top view of the tool diagrammed in FIG. 12A.
FIG. 12C is a cross-sectional view of fixture whereon is mounted the beveling cutting blade diagrammed in FIG. 12A.

(4.3) A third example is described with reference to FIGS. 12A–12C. A male thread milling cutter blade 165 and a drill 16 are formed on the same shaft. A burr removal cutting blade 162 is formed at the end of the milling cutter blade 165 on the side of the neck 164. This burr removal cutting blade 162 is used also for hole exit beveling.

To this neck 164 is attached a saddle that can be secured in any position along the length thereof, and on that saddle is mounted a tip 163 in which is formed a hole entrance beveling cutting blade 163a. Accordingly, the position of the tip 163 is adjusted so that the distance between the hole entrance beveling cutting blade 163a and the cutting blade 162 for removing burrs that develop at hole exits becomes a value corresponding with the depth T of the machined hole (cf. FIG. 12A).

Center holes are opened with the drill 16 (three-bladed in FIG. 12B) in the top. The centerline of the hole is indicated by the line 160 in FIG. 12A. After opening this hole with the drill, the tool is pulled back and male thread cutting is performed by imparting a screw feed and eccentricity E to the male thread milling cutter blade 165.

After the male thread cutting with the male thread milling cutter blade 165 is finished, an eccentric movement is imparted to the tool inside the hole opened by the drill 16, thereby simultaneously performing hole entrance beveling by the cutting blade 163a and hole exit burr removal by the cutting blade 162.

(5) Specific working modes of machined hole exit burr removal using the complex cutting-blade tool are now described.

Figure 13A:
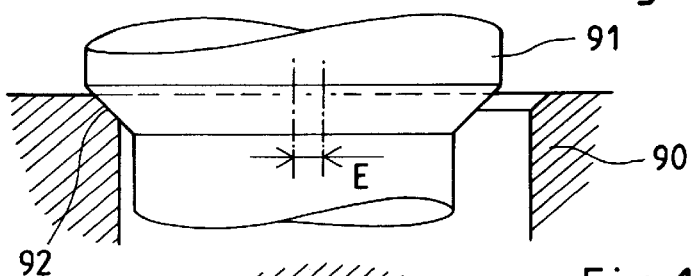
FIGS. 13A, 13B and 13C are diagrams for describing the movement of a tool when removing burrs from the exit of a through hole formed in workpiece.
Figure 13B:
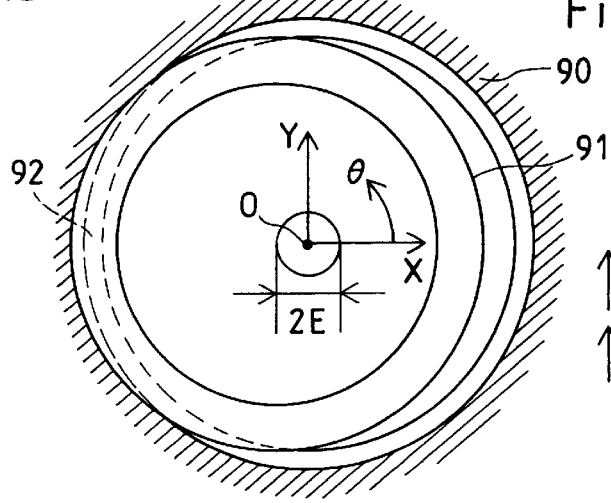
Figure 13C:
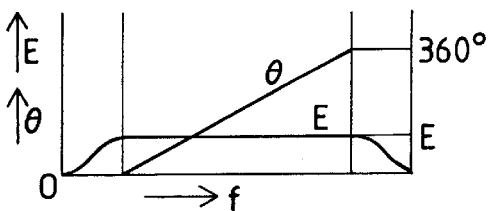
Figure 14A:
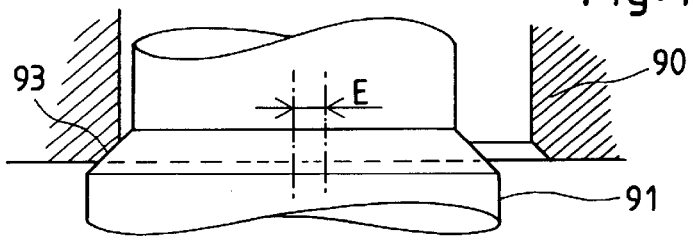
FIGS. 14A, 14B and 14C are diagrams for describing the movement of a tool when beveling the entrance of a through hole formed in workpiece.
Figure 14B:
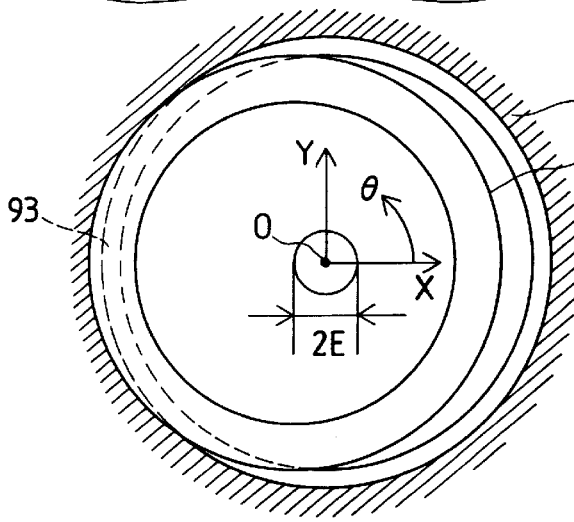
Figure 14C:
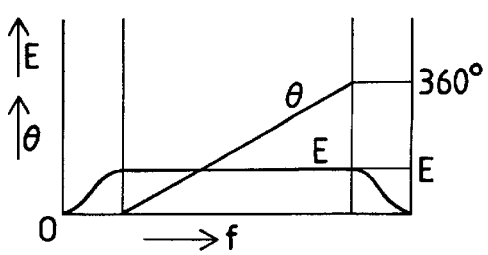

(5.1) In a first case, a through hole is machined in flat plate workpiece, in a direction perpendicular to the surface of that work, and burr removal and beveling are performed on that machined hole (FIGS. 13A–13C; FIGS. 14A–14C).

A through hole is machined in workpiece 90 with a tool (drill) 91. Then the tool 91 is moved relative to the workpiece 90, a burr removal cutting blade 92 is moved up against the exit end of the machined hole, cutting is performed to cut away the burrs, and beveling is also performed.

If the tool 91 is a twist drill and a rake angle is imparted to the burr removal cutting blade 92, the turning direction of the tool 92 when performing burr removal by the cutting blade 92 will be opposite to the turning direction of the tool 91 when machining the hole with the twist drill, due to the relationship of the spiral flutes in the twist drill.

When the tool 91 is moved and the burr removal cutting blade 92 is brought up against the exit end of the machined hole, the machined hole entrance beveling cutting blade 93 simultaneously comes up against the exit end of the machined hole. Accordingly, at the same time that burr removal is performed on the exit of the machined hole by the cutting blade 92 by rotating the tool 91 and causing it to revolve (cf. FIG. 13A), beveling can be performed on the exit of the machined hole (cf. FIG. 14A).

The amount of movement of the tool 91 relative to the workpiece 90 is expressed below in terms of a rectangular coordinate system (x, y), where E is the eccentricity (variable) of the tool center axis from the hole center axis and θ is the relative revolving angle with respect to the workpiece 90.

$$x = E \cos \theta \quad (1)$$

$$y = E \sin \theta \quad (2)$$

Examples of the variation in the eccentricity E and turning angle θ relative to time t are diagrammed in FIG. 13C (for burr removal) and FIG. 14C (for beveling).

The rotating direction of the tool 91 which is being rotated in one direction to simultaneously perform hole exit burr removal with the cutting blade 92 and hole entrance beveling with the cutting blade 93 must be opposite to the direction of the tool 91 which is cutting the hole out if that tool 91 is a twist drill, as described earlier. If the tool 91 is a tip-clamp drill, however, depending on the tip attachment configuration, the rotating direction of the tool 91 which is performing burr removal and beveling can be made the same as the rotating direction of the tool 91 which is machining the hole.

Figure 15A:
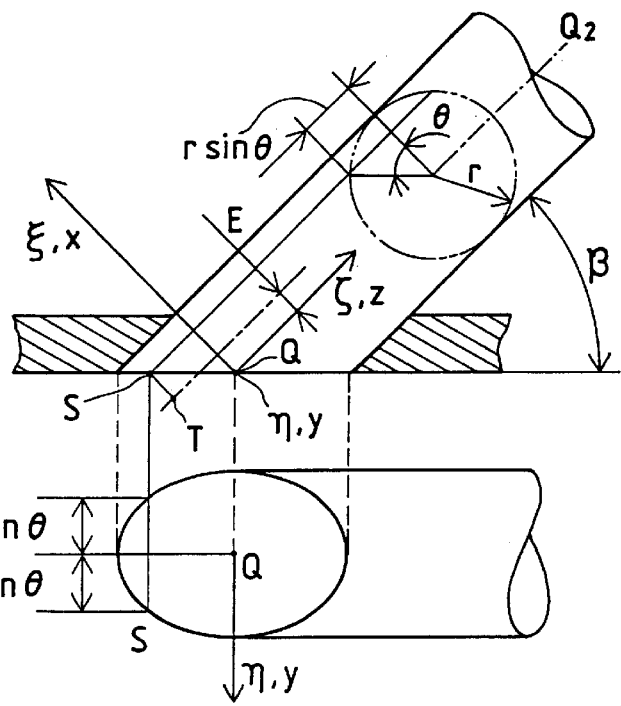
FIGS. 15A and 15B are diagrams for describing the way in which burr removal or beveling is performed on a through hole machined on a slant in flat plate workpiece.
Figure 15B:
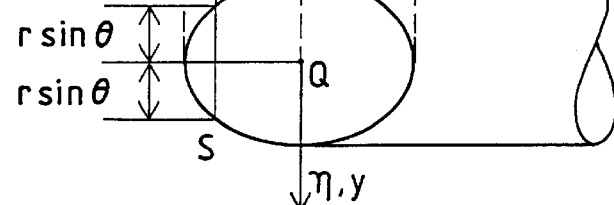

(5.2) In a second case, a through hole is machined in flat plate workpiece, on a diagonal relative to the surface of that workpiece, and burr removal and beveling are performed on that machined hole (FIGS. 15A, 15B).

As diagrammed in FIG. 15A, a tool is advanced at an angle of inclination β relative to the flat bottom surface of flat plate workpiece along the center axis Q2 thereof to form a through hole of radius r centered on the tool center axis Q2 in that workpiece. When this is done, the outline of the hole exit becomes elliptical, as diagrammed in FIG. 15B, with a short radius of 2r and a long radius of 2r/sin β. This ellipse is expressed as below by a rectangular coordinate system (ξ,η,ζ) the origin Q whereof is the point where the tool center axis Q2 intersects the bottom surface of the workpiece. In these equations, θ is the revolving angle of the tool relative to the workpiece.

$$\xi = r \cos \theta \quad (3)$$

$$\eta = r \sin \theta \quad (4)$$

$$\zeta = -r \cos \theta \cot \beta \quad (5)$$

The position of movement of the tool center T is expressed as below using rectangular coordinates (x, y, z)

having Q as the origin. In these equations, E is the eccentricity of the tool center T relative to the machined hole center.

$$x = E \cos \theta \quad (6)$$

$$y = E \sin \theta \quad (7)$$

$$Z = -r \cos \theta \cot \beta \quad (8)$$

Figure 16:
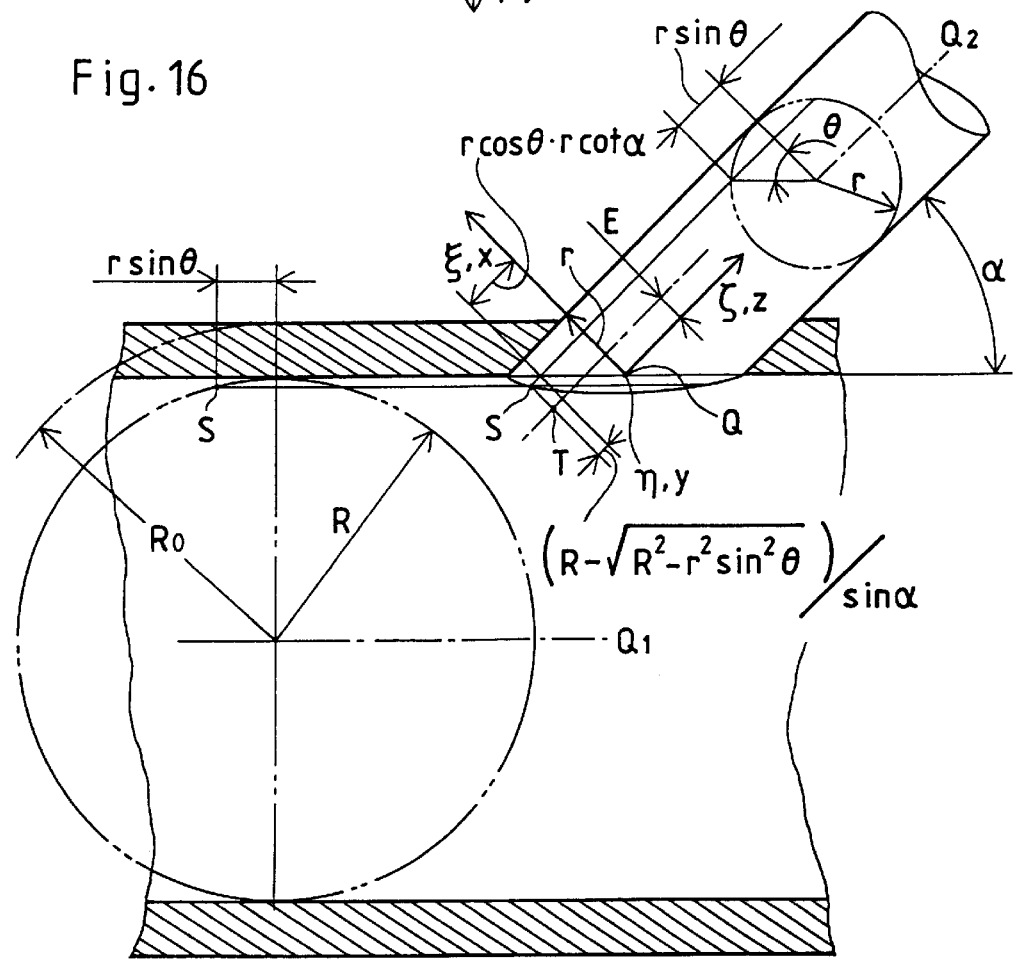
FIG. 16 is a diagram for describing the way in which burr removal or beveling is performed on a through hole machined on a slant in round pipe.

(5.3) In a third case, a through hole is opened in a round pipe for the purpose of connecting a branch pipe thereto (FIG. 16).

In the case diagrammed in FIG. 16, a hole is machined in a trunk pipe (having inner diameter 2R and center axis Q1) for the purpose of attaching thereto a branch pipe (having inner diameter 2r and center axis Q2).

In FIG. 16, S represents the point of intersection between a plane parallel to a plane containing both the center axis Q1 of the trunk pipe and the center axis Q2 of the branch pipe and the junction line of both pipes at the inner walls of the pipes. If we represent this intersection S in a rectangular coordinate system ($\xi$, $\eta$, $\zeta$) having as its origin the intersection Q between the center axis Q2 of the branch pipe and the inner wall surface of the trunk pipe, taking $\theta$ as the declination angle, we obtain $$\xi = r \cos \theta \quad (9)$$

$$\eta = r \sin \theta \quad (10)$$

$$\zeta = -r \cos \theta \cot \alpha - (R - \sqrt{R^2 - r^2 \sin^2 \theta})/\sin \alpha = (R/\sin \alpha)^* [\sqrt{1+(p^{2-r^{2/R^2}})} - 1 - p \cos \alpha] \quad (11)$$

where p=(r/R) cos $\theta$
while, using the rectangular coordinate system (x, y, z), we find below the amount of movement in the tool center T.

$$x = E \cos \theta \quad (12)$$

$$y = E \sin \theta \quad (13)$$

$$z = (R/\sin \alpha)^* [\sqrt{1+(p^{2-r^{2/R^2}})} - 1 - p \cos \alpha] \quad (14)$$

In the particular case here $\alpha = 90°$ we obtain $$\xi = r \cos \theta \quad (9')$$

$$\eta = r \sin \theta \quad (10')$$

$$\zeta = R[\sqrt{1+(p^2-r^2/R^2)} - 1] \quad (11')$$

In this case, using the rectangular coordinate system (x, y, z) we find the amount of movement in the tool center T as below.

$$x = E \cos \theta \quad (12')$$

$$y = E \sin \theta \quad (13')$$

$$z = R[\sqrt{1+(p^2-r^2/R^2)} - 1] \quad (14')$$

If the rectangular coordinates ($\xi_o, \eta_o, \zeta_o$) for the point So where the junction line of the two pipes at the outer walls of the pipes intersects with the plane are represented in a rectangular coordinate system the origin whereof is the intersection Qo between the outer surface of the trunk pipe and the center axis Q2 of the branch pipe, and the position of movement of the tool center To is represented using a rectangular coordinate system (xo, yo, zo) having as its origin the intersection Qo, then R will be replaced by Ro in Equations 9–14 and 9'–14' above. However, the difference between the values of S and So is very small, the difference in the amounts of hole entrance beveling is very small even when the hole exit and hole entrance are machined simultaneously, and the hole entrance is filled in by welding, wherefore in practice there is no problem.

(5.4) Another case is one wherein burr removal and beveling are performed on a hole machined in any curved surface in general.

When a branch pipe is attached to an elliptical pipe, a spherical shell, or a conical shell (hereinafter called the trunk pipe), a hole is first opened in the trunk pipe with a drill, after which a burr removal cutting blade is moved relatively and three-dimensionally along the cut ridge line formed at the exit of that hole while, simultaneously, a beveling cutting blade is moved relatively and three-dimensionally along the cut ridge line formed at the entrance of that hole. In such cases a tool having a short hole-opening cutting blade part is sometimes necessary to avoid interference between the cutting blade and the inner surface of the trunk pipe. This problem may be nicely resolved by using an end mill having a spherical cutting blade 141, as diagrammed in FIG. 10A, wherein the shaft of the ball end mill has been shortened. If this end mill is used, the blade top will not readily bend even when holes are opened on a slant in the trunk pipe.

(5.5) Controller

An NC controller is employed in order to move the complex cutting-blade tool relatively with respect to the machined hole and simultaneously perform burr removal on the machined hole and beveling on the entrance of the hole.

If the machining control program is simple, then the program can be put together and input into the controller for each part to be machined. However, in order to expediently handle cases where complex functions are involved, as when three-dimensional NC is performed, permanent basic program software capable of computing the necessary functions can be created so that at execution time all that is required is to input the necessary constants (such as dimensions, etc.). When this is done, a controller product is required which has been preloaded with the basic software for the machining methods. For this purpose, either a controller comprising such basic software may be used, or an accessory product may be added to an existing controller.

The configuration of a controller is described with reference to the block diagram in FIG. 17. Variable constants are input from an input board 171, the requisite computations are performed in a computer command module 172, and the computation results are sent to a control distribution board 173 built into a machine tool 170. By means of signals output from the control distribution board 173, drive control is implemented for a motor 174 that rotates a tool 180, a motor that drives X and Y tables 176 and 177 which move the work being machined by the tool 180 in the x and y dimensions, and a motor that drives a spindle head 178 which holds the tool 180, respectively.

Figure 17:
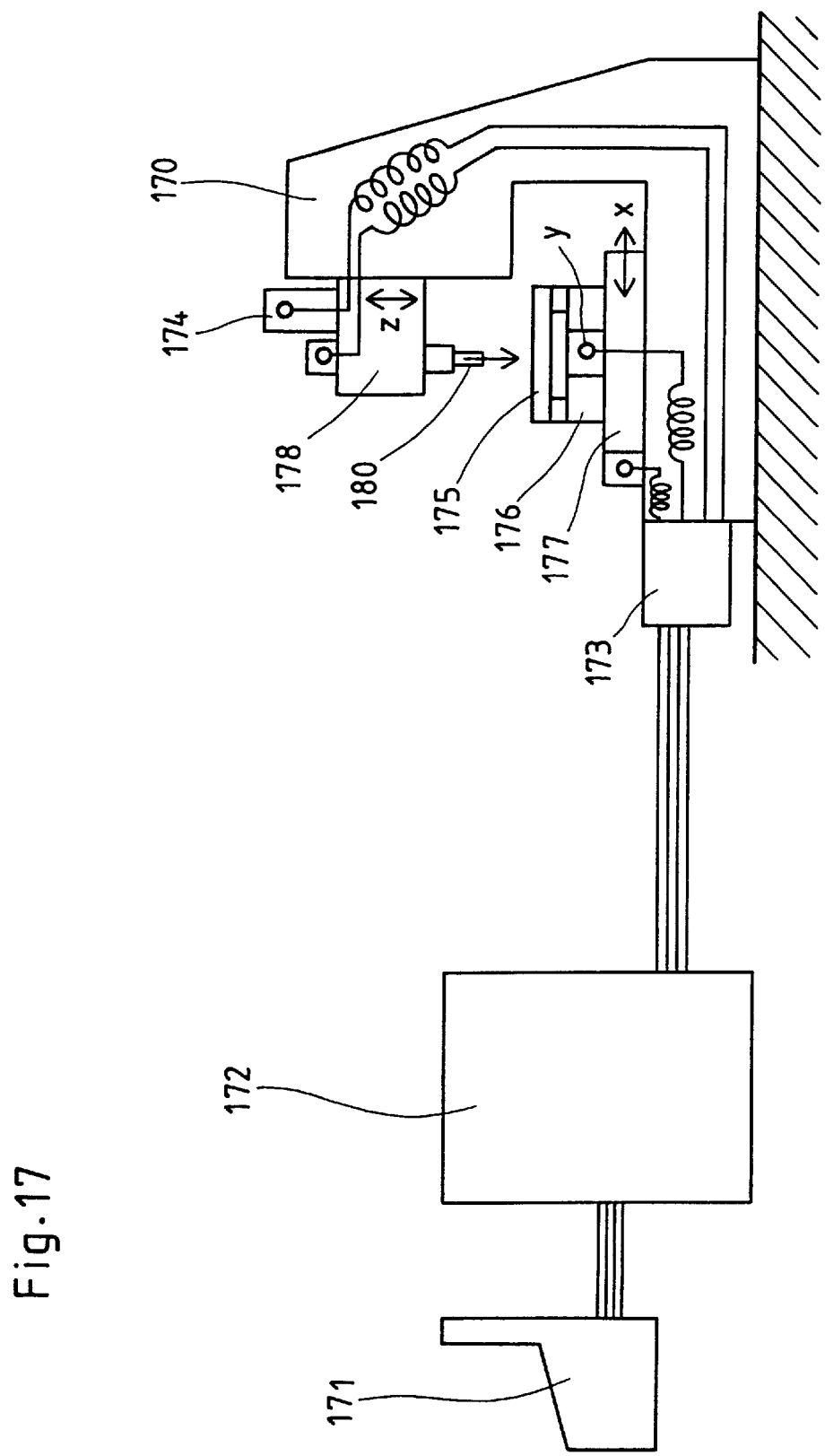
FIG. 17 is a block diagram of a control apparatus for controlling a machine tool to which a complex cutting-blade tool is attached.

The input board 171, computer command module 172, and control distribution board 173 in FIG. 17 are integrated into a CNC system.

For small-lot multiple-model production, a function may be added for controlling the position of the hole entrance beveling tool platform.

What is claimed is:

1. A complex cutting-blade tool comprising:
   a hole-opening cutting blade;
   a neck, in back of said hole-opening cutting blade, having an outer diameter smaller than an outer diameter of said hole-opening cutting blade;

a hole exit burr removal and beveling cutting blade provided at a place of connection between said hole-opening cutting blade and said neck at an angle of inclination of 45° or an angle near thereto with respect to a tool center axis;

a fixture, mounted on said neck, having a securing device to secure said fixture to said neck at any position in a length dimension thereof and to release that securing; and a hole entrance beveling cutting blade mounted on said fixture at an angle of inclination of 45° or an angle near thereto with respect to a tool center axis in a direction opposite to inclination of said hole exit burr removal and beveling cutting blade.

2. The complex cutting-blade tool according to claim 1, wherein said hole-opening cutting blade comprises an inner cutting blade forming a concavity from a top thereof toward tool center, wherein said inner cutting blade machines a hole center.

3. The complex cutting-blade tool according to claim 1, wherein said hole-opening cutting blade comprises a pair of triangular or square tips at a top thereof, and hole exit burr removal and beveling cutting blades are formed either on one side of each tip or where an apex corner thereof has been removed.

4. The complex cutting-blade tool according to claim 1, wherein said hole-opening cutting blade comprises a pair of triangular or square primary tips at a top thereof and, at a position behind said tips, one or two triangular or square secondary tips, in one side of which secondary tip or tips is formed a hole exit burr removal and beveling cutting blade.

5. A complex cutting-blade tool, comprising:

a ball end mill having a roughly spherical head and a shaft having a diameter smaller than a diameter of said head;

a spherical cutting blade extended to a rear thereof;

a burr removal cutting blade, connected to said spherical cutting blade, to which is imparted a suitable clearance angle that is approximately 45° relative to a tool center axis;

a fixture, attached to said shaft said fixture comprising a securing device to secure said fixture to said shaft at any position in a length dimension thereof and to release that securing; and a hole entrance beveling cutting blade mounted on said fixture at an angle of inclination of 45° or an angle near thereto with respect to the tool center axis in a direction opposite to inclination of said burr removal cutting blade.

6. The complex cutting-blade tool according to claim 5, wherein said fixture to which said hole entrance beveling cutting blade is mounted comprises a securing device to secure said fixture at any position in length dimension of an end mill shaft and to release that securing.

7. A complex cutting-blade tool, comprising:

a reamer cutting blade including a shaft;

a burr removal cutting blade inclined roughly 45° relative to center axis of said tool provided at the shaft end of the reamer cutting blade, and having a suitable clearance angle;

a fixture attached to said shaft, said fixture comprising a securing device to secure said fixture to said shaft at any position in a length dimension thereof and to the release that securing; and a hole entrance beveling cutting blade mounted on said fixture at an angle of inclination of 45° or an angle near thereto with a center axis of tool turning in a direction opposite to inclination of said burr removal cutting blade.

8. The complex cutting-blade tool according to claim 7, wherein said fixture to which said hole entrance beveling cutting blade is mounted comprises a securing device to secure said fixture to a reamer shaft at any position in length dimension of the reamer shaft and to release that securing.

9. A complex cutting-blade tool, comprising:

a male thread milling cutter blade integrated on a shaft with a drill;

a burr removal cutting blade formed on the shaft end of the male thread milling cutting blade;

a fixture attached to said shaft, said fixture comprising a securing device to secure said fixture to said shaft at any position in length dimension thereof and to release that securing; and a hole entrance beveling cutting blade mounted on said fixture at an angle of inclination of 45° or an angle near thereto with a center axis of tool turning in a direction opposite to inclination of said burr removal cutting blade.

10. The complex cutting-blade tool according to claim 9, wherein said fixture to which said hole entrance beveling cutting blade is mounted further comprises a securing to secure said fixture at any position in a length dimension of a tool shaft and to release that securing.

* * * * *